US006680724B2

(12) United States Patent
Lichtfuss

(10) Patent No.: US 6,680,724 B2
(45) Date of Patent: Jan. 20, 2004

(54) FLEXIBLE ELECTRONIC VIEWING DEVICE

(75) Inventor: Hans A. Lichtfuss, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 266 days.

(21) Appl. No.: 09/873,174

(22) Filed: May 31, 2001

(65) Prior Publication Data

US 2002/0180709 A1 Dec. 5, 2002

(51) Int. Cl.[7] .................................................. G09G 5/08
(52) U.S. Cl. ........................................ 345/102; 345/166
(58) Field of Search ................................ 345/102, 107, 345/204; 364/308.1; 365/147; 341/141, 791; 312/7.2; 361/380; 348/790

(56) References Cited

U.S. PATENT DOCUMENTS

| 5,093,985 | A | | 3/1992 | Houldsworth et al. | |
|---|---|---|---|---|---|
| 5,295,089 | A | * | 3/1994 | Ambasz | 361/681 |
| 5,821,688 | A | | 10/1998 | Shanks et al. | |
| 5,846,853 | A | | 12/1998 | Otsuki et al. | |
| RE36,843 | E | | 8/2000 | Lake et al. | |
| 6,137,221 | A | | 10/2000 | Roitman et al. | |
| 6,160,377 | A | | 12/2000 | Fujii | |
| 6,301,098 | B1 | * | 10/2001 | Kim | 361/680 |
| 6,307,751 | B1 | | 10/2001 | Bodony et al. | |
| 6,310,675 | B1 | * | 10/2001 | Yaniv | 349/141 |
| 6,490,402 | B1 | * | 12/2002 | Ota | 385/147 |
| 6,498,597 | B1 | * | 12/2002 | Sawano | 345/107 |
| 2001/0043513 | A1 | | 11/2001 | Grupp | |
| 2002/0024499 | A1 | * | 2/2002 | Karidis et al. | 345/156 |
| 2002/0071066 | A1 | | 6/2002 | Silverbrook | |
| 2002/0182544 | A1 | * | 12/2002 | Chan-Park et al. | 430/311 |
| 2003/0020701 | A1 | * | 1/2003 | Nakamura | 345/204 |

FOREIGN PATENT DOCUMENTS

| DE | 19635122 A | 3/1998 |
|---|---|---|
| EP | 0225470 A2 | 6/1987 |
| WO | WO 97/50074 | 12/1997 |
| WO | WO 00/46854 | 8/2000 |
| WO | WO 02/075702 | 8/2002 |

OTHER PUBLICATIONS

Page from Lucent Technologies web site (www.lucent.com/press/1100/001120.coa.html), Titled "Innovation marks significant milestone in the development of electronic paper", Dated Nov. 20, 2000, 2 pages.
Page from Universal Display Corporation web site (www.universaldisplay.com/foled.html), Titled "Foled Technology", Not Dated, 1 page.
Page from Universal Display Corporation web site (www.universaldisplay.com/press.shtml), Titled New Universal Display Flexible OLED Technology KeyTo High Performance, Color Panels in HandheldDevices, Dated Nov. 24, 2000, 2 pages.

* cited by examiner

Primary Examiner—Vijay Shankar
Assistant Examiner—Nitin Patel

(57) ABSTRACT

A viewing device has a flexible display device operatively connected to a handle. The flexible display device has a first surface, a second surface oppositely disposed with respect to the first surface, and a display edge located between the first surface and the second surface, wherein an image is displayable on the first surface. The handle has a surface formed thereon, wherein the display edge is operatively connected to the handle surface.

21 Claims, 2 Drawing Sheets

FLEXIBLE ELECTRONIC VIEWING DEVICE

TECHNICAL FIELD OF THE INVENTION

The present invention relates to viewing devices and, more particularly, to a viewing device having a substrate connected to a flexible display device.

BACKGROUND OF THE INVENTION

Digital imaging devices, such as digital cameras and optical scanning devices (scanners), convert an image to machine-readable image data (image data). The image data may be processed so as to replicate the image on an electronic display or viewing device. Processing the image data enables a user to instantaneously generate a replicated image that has many characteristics that are not achievable with conventional film photography. For example, the processing can automatically optimize the color tone and grey scale of an image to a user's preference at any time after the image data has been generated. Optimizing these characteristics using conventional film photography typically must be done at the time the image is photographed or at the time the film is developed.

As briefly described above, one advantage of digital imaging is that the image can be instantaneously replicated by an electronic viewing or display device. In addition, the replicated image can be instantaneously sized and processed for optimal viewing. For example, the image data may be transmitted to a video display for instantaneous viewing. A computer connected to the video display can enlarge or decrease the size of the replicated image displayed on the video display for optimal viewing. Likewise, a replicated image can be processed to enhance color and other characteristics in the image. The same processing abilities apply to image data transmitted to a printer via a computer or directly from a digital imaging device. The size and other characteristics of the replicated image can be modified by the digital imaging device to optimize the printed image.

Many digital cameras enable users to process the image data internally prior to transmitting the image data to a peripheral device to replicate the image. These digital cameras typically have a viewing device, such as a liquid crystal display (LCD), that displays the replicated images. A user may use the digital camera to process the image data and see revisions made to the replicated image prior to downloading the image data to a peripheral device for replication.

Viewing devices that replicate images, however, are not as readily transportable between people as conventional film-type photographs. For example, replicated images that are printed are required to be printed on a high quality paper by a high quality printer in order to have the quality of conventional film-type photographs. The high quality paper and high quality printer, however, are relatively expensive. Furthermore, the time required to print the images can be relatively long.

Conventional video displays, including LCDs, are able to replicate high quality images. Conventional video displays, however, are generally not as readily transportable among people as conventional film-type photographs. The video displays tend to be heavy, bulky, and fragile. Accordingly, a video display, even an LCD associated with a laptop computer, cannot be as readily passed among people as conventional film-type photographs.

Other smaller viewing devices are available. These smaller viewing devices, however, are not as readily transferable among people as conventional film-type photographs. These smaller viewing devices typically use a fragile display device, such as a rigid LCD display having a plurality of rigid substrates. Should one of the substrates become cracked or otherwise damaged, the viewing device will be rendered inoperable. Likewise, should the display device bend or otherwise experience excessive force, it will likely become damaged and the viewing device will be rendered inoperable. For example, if a viewing device is dropped to the floor by a user, the weight of the device will cause a substantial force to be acted on the viewing device upon impact with the floor. The force may damage the display device which will render the viewing device inoperable.

SUMMARY OF THE INVENTION

The present invention is directed toward a viewing device. The viewing device may comprise a flexible display device operatively connected to a handle. The flexible display device may comprise a first surface, a second surface oppositely disposed relative to the first surface, and a display edge located between the first surface and the second surface. An image is displayable on the first surface. The handle may comprise a handle first surface, wherein the display edge is operatively connected to the handle first surface.

DETAILED DESCRIPTION OF THE INVENTION

Figure 1:
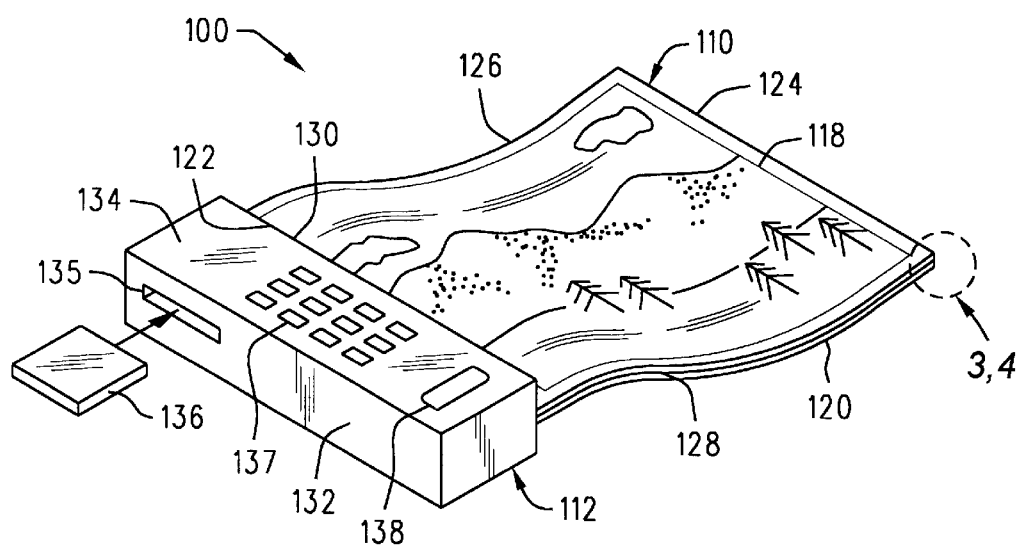
FIG. 1 is an exemplary top perspective view of a viewing device of the present invention.

A non-limiting embodiment of a viewing device 100 is shown in FIG. 1. The viewing device 100 may have a flexible display device 110 operatively or otherwise mechanically and electrically connected to a handle 112. As described below, the handle 112 may contain electronics and a power supply that serve to operate the display device 110.

The display device 110 may have an upper surface 118 and a lower surface 120 oppositely disposed with respect to the upper surface 118. As described in greater detail below, images, such as text, graphics, pictures, or other information, may be displayable on the upper surface 118. The display device 110 may also have a first side 122, a second side 124, a third side 126, and a fourth side 128. The first side 122 may be operatively connected to the handle 112 as is described in greater detail below. In the embodiment described herein, the display device 110 is substantially square. It is to be understood, however, that the display device 110 may be virtually any shape. One embodiment of the display is described in the U.S. patent application, Ser. No. 09/872,888 of Lichtfuss for FLEXIBLE ELECTRONIC DEVICE, filed concurrently with this application.

Figure 2:
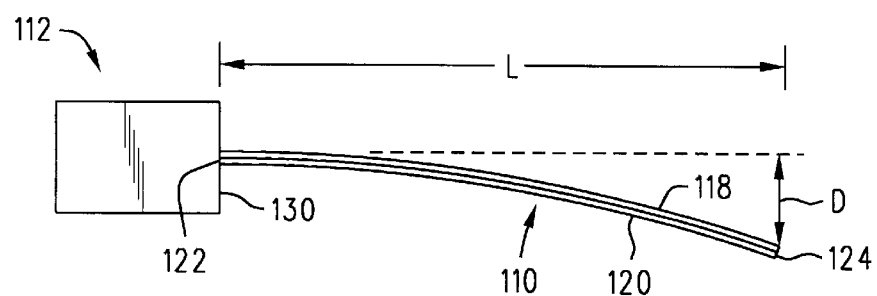
FIG. 2 is a side view of the viewing device of FIG. 1 undergoing deflection or bending.

An example of the display device 110 flexing, bending or otherwise deflecting is shown in FIG. 2. In the preferred embodiment, the display device 110 is sufficiently flexible to deflect from a planar orientation to a deflected orientation without being rendered inoperable. The planar orientation is illustrated as dashed lines and the deflected orientation is shown as a solid line. A deflection distance D is the amount that the second side 124 moves relative to the planar orientation as the display device 110 bends, flexes or otherwise deflects. The length L is the length of the display device 110 between the first side 122 and the second side 124. In one embodiment of the electronic device 100, the electronic device is able to undergo a deflection distance D of at least about one centimeter when the distance L is about twelve centimeters. In other embodiments of the display device 110, the deflection distance D may be different. For example, the deflection distance D may be five centimeters or greater with a length L of about twelve centimeters. It should be noted that the individual layers of the display device 110 preferably are able to deflect or flex as described above in order to allow the whole display device 110 to deflect or flex. As used herein to described the display device 110 as a whole or the individual component layers therein, the term "flexible" means having the capacity to flex or deflect at least one centimeter as described in this paragraph.

The handle 112 may be a rigid structure adapted to be held by a user. For example, the handle 112 may be shaped to fit a human hand. For illustration purposes, the handle 112 described herein is parallelepiped and only three sides of the handle 112 are referenced herein, a first side 130, a second side 132, and a third side 134. As briefly described above, the first side 122 of the display device 110 may be operatively or otherwise electrically and mechanically connected to the first side 130 of the handle 112. Accordingly, the first side 130 of the handle 112 may have electrical contacts, not shown, that electrically connect the handle 112 to the display device 110. The handle 112 may have electronics, not shown, that serve to operate the display device 110 by way of the contacts. In addition, the handle 112 may have a power source, such as a battery, that serves to power the electronics and the display device 110. In another embodiment of the viewing device 100, the handle 112 is flexible.

The second side 132 of the handle 112 may have a slot 135 formed therein that is appropriately sized to accommodate a media device 136. The media device 136 may, as non-limiting examples, be a magnetic disc or an electronic media device. Other components, not shown, that serve to secure the media device 136 within the slot 135 and to transfer data between the media device 136 and the handle 112 may be located within the slot 135. For example, in the embodiment where the media device 136 is an electronic media device, the slot 135 may have electrical contacts that connect to electrical contacts on the media device 136. Likewise, the slot 135 may have securing mechanisms, not shown, located therein that serve to hold the media device 136 within the slot 135 while the viewing device 100 is in use.

The third side 134 of the handle 112 may have a numeric keypad 137 and an increment button 138 mounted thereon. The numeric keypad 137 and the increment button 138 may be conventional switches or pushbuttons and serve as user interfaces. The numeric keypad 137 may be a conventional numeric keypad that includes numeric pushbuttons and function pushbuttons. As will be described in greater detail below, the increment button 138 may serve to increment the image displayed by the display device 110. For example, the media device 136 may store image data representative of a plurality of images. Pressing the increment button 138 may change the image that is displayed on the display device 110. It should be noted that the viewing device 100 may have other types of user interfaces incorporated therein, such as different switching devices.

Figure 3:
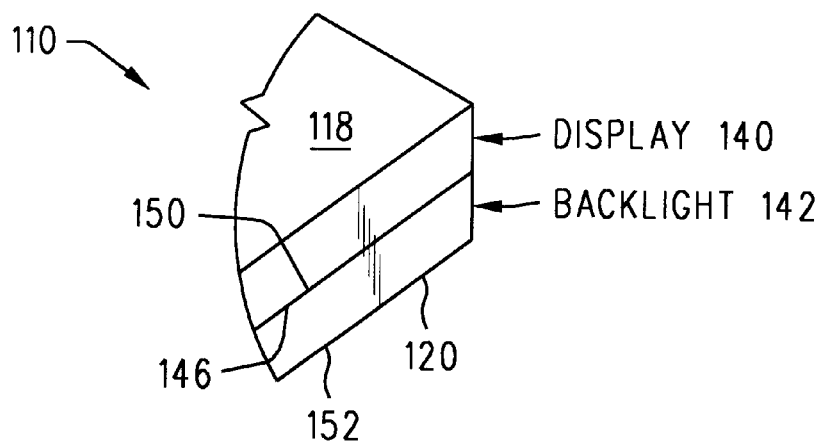
FIG. 3 is a side perspective cut away view of an embodiment of a display device in the viewing device of FIG. 1.

Having summarily described an embodiment of the display device 110 and the handle 112, they will now be described in greater detail. A side cut away view of a non-limiting embodiment of the display device 110 is shown in FIG. 3. The display device 110 of FIG. 3 may have a display layer 140 operatively connected to a backlight layer 142. The display layer 140 may have an upper surface 118, which is the upper surface 118 of the display device 110. The display layer 140 may also have a lower surface 146 oppositely disposed relative to the upper surface 118. Accordingly, the upper surface 118 is adapted to have an image displayed thereon. In one non-limiting embodiment of the display device 110, electrical contacts or other devices, not shown, are located on the lower surface 146 of the display layer 140 to operatively connect the display layer 140 to the backlight layer 142. Similar contacts may also serve to electrically connect the display layer 140 to the handle 112, FIG. 1.

In one non-limiting embodiment of the display layer 140, the display layer 140 is a liquid crystal display (LCD) device. The liquid crystal may be located between flexible layers, not shown, such as flexible polymers, that maintain the flexibility of the display device 110. Electric contacts, not shown, within the display layer 140 serve to conduct electricity to the liquid crystal. When electricity is conducted to the liquid crystals, the molecules within the liquid crystal disrupt from a normally ordered and transparent structure to a disordered and nontransparent structure. Accordingly, information may be displayed by providing an electric potential to specific portions of the liquid crystal within the display layer 140.

Like the display layer 140, the backlight layer 142 may have an upper surface 150 and a lower surface 152. As with the display layer 140, the upper surface 150 of the backlight layer 142 may have contacts or other devices, not shown, that serve to operatively connect the display layer 140 to the backlight layer 142. Similar contacts may also serve to operatively connect the backlight layer 142 to the handle 112, FIG. 1. The backlight layer 142 serves to emit light from the upper surface 150 and through the display layer 140. When the order of the liquid crystal molecules in the display layer 140 is disrupted by the application of an electric potential, the light emitted by the backlight layer 142 cannot pass uninterrupted through the disrupted portion of the display layer 140. The light in combination with the disrupted liquid crystal creates the image displayed on the upper surface 118 of the display device 110.

As described above, the display device 110 is flexible. Accordingly, the mechanism used to affix the display layer 140 to the backlight layer 142 should maintain the flexibility of the display device 110. For example a transparent and pliable adhesive having a low durometer may be applied between the display layer 140 and the display layer 140 to adhere the layers together.

In addition to being flexible, the display device 110 is also lightweight. As implied above, there are no heavy substrates used within the display device 110. Accordingly, the display device 110 is lighter than conventional display devices. As described in greater detail below, the lightweight display device 110 increases the durability of the display device 110 and the viewing device 100, FIG. 1, as a whole. For example, if the viewing device 100 is dropped, there is a reduced probability that the impact of the drop will render the viewing device 100 inoperable because only a minimal force acts upon the lightweight display device 110 upon impact.

Having described the components of the viewing device 100, the operation of the viewing device 100 will now be described.

Referring again to FIG. 1, the viewing device 100 serves to convert image data to an image for display by the display device 110. Because the display device 110 is flexible, the viewing device 100 can be mishandled to a greater extent than a conventional viewing device without suffering damage. The flexibility of the display device 110 also provides for the viewing device 100 to be easily passed among people. For example, the display device 110 may wrap around the handle 112 so as to be compact and easily transported or handed to a person.

Image data is downloaded to the handle 112 of the viewing device 100 from the media device 136. The handle 112 may have a memory device, such as electronic random access memory that stores the image data downloaded from the media device 136. In another embodiment of the viewing device 100, the image data is stored on the media device 136 and is not stored in the viewing device 100. Electronics and/or software in the handle 112 transform the image data to a format so that images represented by the image data can be replicated on the upper surface 118 of the display device 110.

Image data representative of a first image is processed by the handle 112 so as to cause the first image to be displayed on the upper surface 118 of the display device 110. A user may press the increment button 138 to cause successive images to be displayed on the upper surface 118 of the display device 110. A user may display a specific image by use of the numeric keypad 137. For example, a user wishing to view the seventh image may press the number seven, not shown, on the numeric keypad 137, which will cause the viewing device 100 to display the seventh image on the display device 110.

The viewing device 100 has many advantages over conventional film-type photographs. For example, film-type photographs wear and are subject to being damaged when they are passed among people. The display device 110 is more durable than film-type photographs and can be cleaned unlike film-type photographs. Accordingly, the images displayed by the display device 110 are not subject to degradation after being passed among users. In addition, the images displayed by the viewing device 100 remain in a predetermined order, whereas conventional film-type photographs tend to become disorganized as they are passed among people.

Having described an embodiment of the viewing device 100, other embodiments will now be described.

The display device 110 described in FIGS. 1 and 2 uses a liquid crystal display device, which requires a relatively high amount of power. One embodiment of the display device 110 uses a flexible light-emitting device. This embodiment alleviates the need for the backlight layer 142. Accordingly, the display device 110 may have a single layer, which may increase the flexibility of the display device 110. More specifically, the single layer eliminates the slip planes inherent with regard to the display device 110 having a display layer 140 and a backlight layer 142 operatively connected together. In one non-limiting embodiment of the viewing device 100, the display device 110 is a flexible organic light-emitting display. Such displays are known in the art.

The flexible light-emitting device may use less power than the LCD device using the backlight layer 142. Accordingly, a portable power source, such as the above-referenced batteries, associated with the viewing device 100 may last longer. The use of the flexible light-emitting device may also improve viewing of the viewing device 100 in dark conditions.

Figure 4:
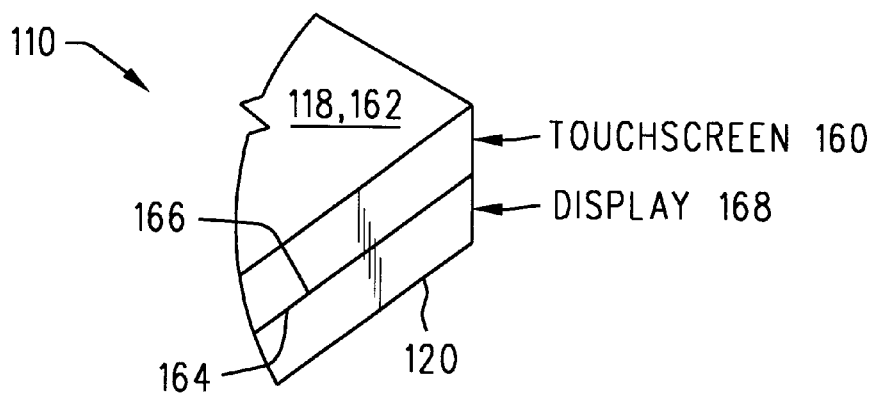
FIG. 4 is a side perspective cut away view of an embodiment of a display device having a touch screen associated therewith.

Another embodiment of the display device 110 includes the addition of a flexible pressure sensing layer 160 or a touchscreen 160 is shown in FIG. 4. The pressure sensing layer 160 may be a transparent layer having an upper surface 162 and a lower surface 164. The upper surface 162 of the pressure sensing layer 160 is the same surface as the upper surface 118 of the display device 110 as shown in FIG. 1. The lower surface 164 is operatively connected to an upper surface 166 of a display layer 168. The display layer 168 may be substantially similar to the display devices described above and may serve to display data generated by the handle 112, FIG. 1.

The pressure sensing layer 160 may serve as an input device for the viewing device 100, FIG. 1. For example, a user may modify the replicated image displayed on the display device 110 by use of the pressure sensing layer 160. In one example of modifying a displayed image, a user may input an enlarge command to the handle 112 by pressing preselected keys on the numeric keypad 137. The user may then enlarge a portion of the replicated image by pressing the pressure sensing layer 160 in the vicinity of the replicated image that is to be enlarged.

The pressure sensing layer 160 may also enable a user to select images to be replicated. For example, the display device 110 may display a plurality of small thumbnail images on the display device 110 that are representative of images stored in the media device 136. A user may enlarge one of the thumbnail images by simply pressing the pressure sensing layer 160 in the vicinity of the thumbnail image that is to be enlarged.

The pressure sensing layer 160 offers other advantages, such as the ability to select a portion of an image to edit. For example, a user may eliminate redeye displayed in eyes by selecting the eyes. This may be accomplished by pressing a portion of the pressure sensing layer 160 surrounding the eyes. The user may then input a command via the numeric keypad 137 that causes the handle 112 to process the image data so as to eliminate the redeye from the selected portion of the image.

In one embodiment of the viewing device 100, characteristics of the image can be modified per the numeric keypad 137. For example, a user may enhance or attenuate certain colors in the image by entering appropriate commands into the numeric keypad 137. When used with the pressure sensing layer 160 described above, the user may select a portion of the image and enhance or attenuate colors in the selected portion of the image.

One embodiment of the viewing device 100 includes a help mode. The help mode may be entered by pressing a preselected key in the numeric keypad 137. Information regarding the above described functions of the viewing device 100 may then be displayed on the display device 110.

The viewing device 100 may also include devices and means that enable the viewing device 100 to communicate with peripheral devices. Communication means such as infrared and radio frequency can be added to the handle 112 of the viewing device 100 to enable the viewing device 100 to communicate with a peripheral device. For example, the communication means may enable the viewing device 100 to download image data to a printer. Thus, select images may be printed after they have been viewed by a user. In addition, image data may be downloaded to the viewing device 100 from a computer or a digital imaging device via the communication means. These communication means in addition to the slot 135, the numeric keypad 137, and the increment button 138 are sometimes referred to as data transfer devices.

What is claimed is:

1. A viewing device comprising:
   a flexible display device comprising a first surface and a second surface oppositely disposed relative to said first surface, wherein an image is displayable on said first surface, wherein said flexible display device comprises a display layer comprising a display layer first surface and a display layer second surface, wherein an image is displayable on said display layer first surface;
   a backlight layer comprising a backlight first surface and a backlight second surface oppositely disposed with respect to said backlight first surface;
   said display layer second surface being adjacent said backlight layer first surface; and
   a handle;
   said display device being operatively connected to said handle.

2. The device of claim 1, wherein said flexible display device is an organic light-emitting device.

3. The device of claim 1, wherein said flexible display device comprises liquid crystal and a polymer.

4. The device of claim 1, wherein said handle comprises a power source operatively connected to said flexible display device.

5. The device of claim 1, wherein said handle comprises a data transfer device.

6. The device of claim 5, wherein said data transfer device is compatible with magnetic media.

7. The device of claim 5, wherein said data transfer device is compatible with electronic media.

8. The device of claim 5, wherein said data transfer device is a radio frequency device.

9. The device of claim 5, wherein said data transfer device is an optical device.

10. The device of claim 1, wherein said handle comprises a plurality of switches, wherein toggling at least one of said plurality of switches causes said displayable image to change.

11. The device of claim 1, wherein said handle comprises a plurality of buttons, wherein pressing at least one of said plurality of buttons causes said displayable image to change.

12. The device of claim 1, and further comprising a pressure sensing layer located adjacent said display device, said pressure sensing layer detecting the application of a force thereon and generating data corresponding to the location of said application of force.

13. A viewing device comprising:
    a flexible display device comprising a first surface and a second surface oppositely disposed relative to said first surface, wherein a first image is displayable on said first surface; and
    a handle comprising a switch having a first operative position and a second operative position, wherein a second image is displayable on said first surface of said display device upon said switch toggling between said first operative position and said second operative position;
    said display device being operatively connected to said handle.

14. The device of claim 13, wherein said flexible display device is an organic light-emitting device.

15. The device of claim 13, wherein said flexible display device comprises liquid crystal and a polymer.

16. The device of claim 13, wherein said handle comprises a power source operatively connected to said flexible display device.

17. The device of claim 13, wherein said handle comprises a data transfer device.

18. The device of claim 17, wherein said data transfer device is compatible with magnetic media.

19. The device of claim 17, wherein said data transfer device is compatible with electronic media.

20. The device of claim 17, wherein said data transfer device is a radio frequency device.

21. The device of claim 17, wherein said data transfer device is an optical device.

* * * * *